(12) United States Patent
Kanemitsu et al.

(10) Patent No.: US 8,102,445 B2
(45) Date of Patent: Jan. 24, 2012

(54) SOLID-STATE IMAGE-CAPTURING APPARATUS, CAMERA, AND METHOD OF PROCESSING SIGNAL

(75) Inventors: Shiroshi Kanemitsu, Kanagawa (JP); Takaaki Kawakami, Kanagawa (JP); Junichi Hosokawa, Kanagawa (JP); Yuuki Koguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 12/493,529

(22) Filed: Jun. 29, 2009

(65) Prior Publication Data

US 2010/0033596 A1 Feb. 11, 2010

(30) Foreign Application Priority Data

Aug. 11, 2008 (JP) ................................. 2008-207335

(51) Int. Cl.
*H04N 9/64* (2006.01)
*H04N 5/00* (2006.01)
(52) U.S. Cl. ........................................ 348/251; 348/615
(58) Field of Classification Search ........................ None
See application file for complete search history.

(56) References Cited

U.S. PATENT DOCUMENTS

| 7,634,152 B2 * | 12/2009 | Silverstein | 382/275 |
|---|---|---|---|
| 2007/0211154 A1 * | 9/2007 | Mahmoud et al. | 348/251 |
| 2009/0067744 A1 * | 3/2009 | Kawanishi et al. | 382/274 |

FOREIGN PATENT DOCUMENTS

| JP | 11-112837 | 4/1999 |
| JP | 2001-167263 | 6/2001 |
| JP | 2001-339736 | 12/2001 |
| JP | 2005-269373 | 9/2005 |
| JP | 2007-36844 | 2/2007 |
| JP | 2007-66231 | 3/2007 |
| JP | 2007-134903 | 5/2007 |
| JP | 2008-28454 | 2/2008 |
| KR | 1993-0011612 | 6/1993 |

OTHER PUBLICATIONS

Office Action issued Dec. 15, 2010 in Korea Application No. 10-2009-0073188.
Office Action issued Feb. 1, 2011 in Japan Application No. 2008-207335 (With English Translation).

* cited by examiner

*Primary Examiner* — Lin Ye
*Assistant Examiner* — Euel Cowan
(74) *Attorney, Agent, or Firm* — Oblon, Spivak, McClelland, Maier & Neustadt, L.L.P.

(57) ABSTRACT

A solid-state image-capturing apparatus that converts light, which is reflected from a subject, into an electrical signal, includes an image processing unit that performs edge enhancement on a digital video signal that is generated based on an analog video signal, which is obtained from the light captured by an image-capturing device and amplified with a predetermined analog gain, based on position information on the image-capturing device and the analog gain.

18 Claims, 5 Drawing Sheets

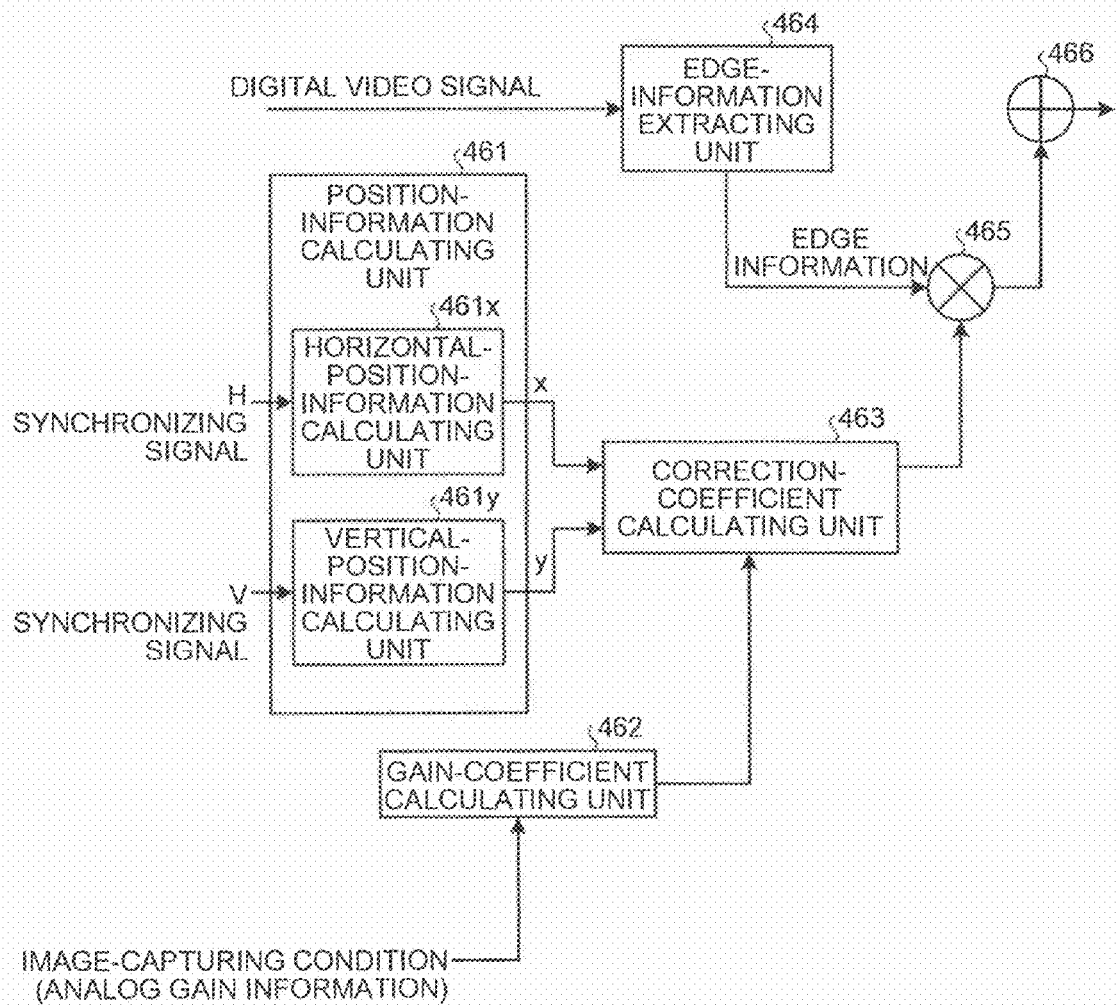

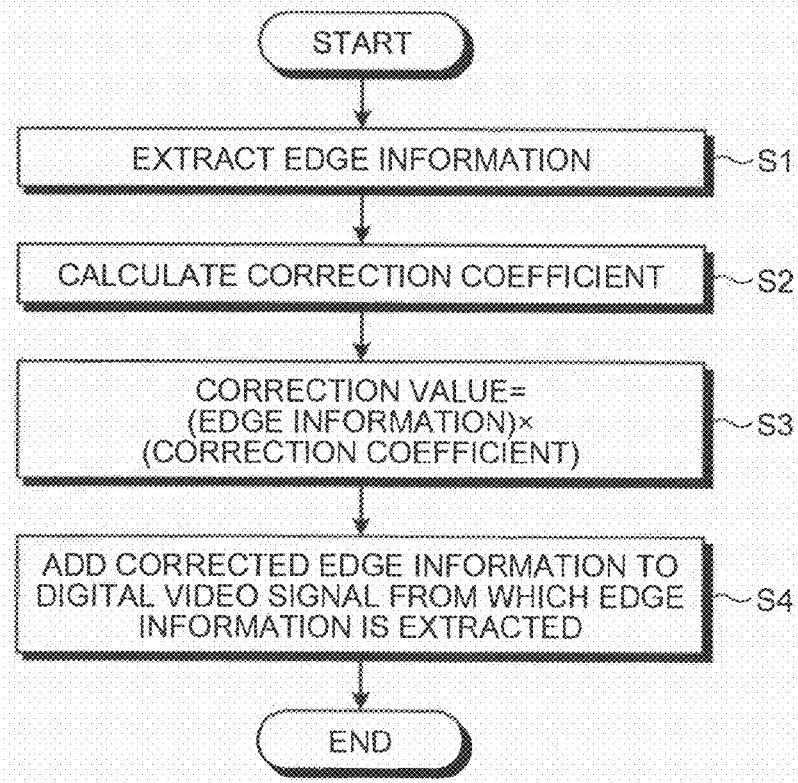
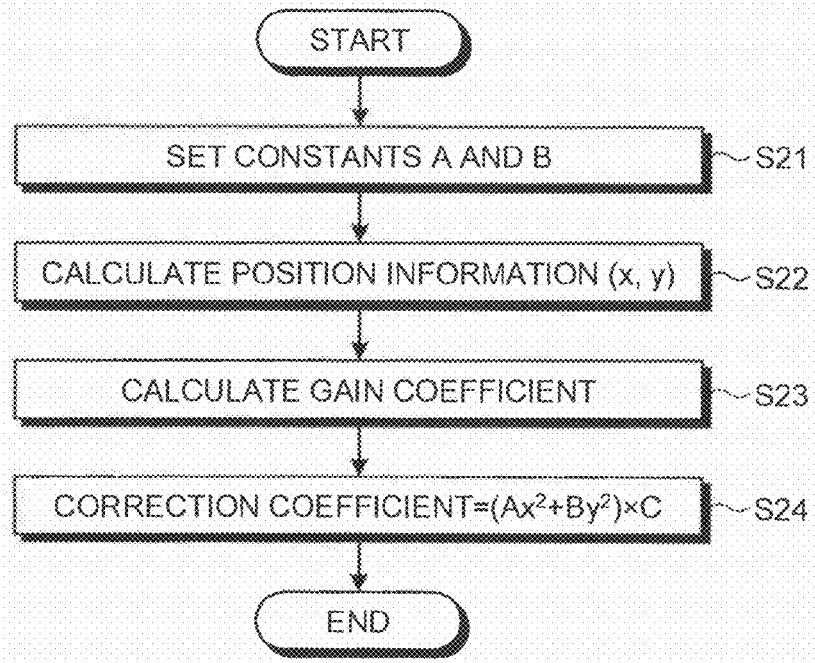

SOLID-STATE IMAGE-CAPTURING APPARATUS, CAMERA, AND METHOD OF PROCESSING SIGNAL

CROSS-REFERENCE TO RELATED APPLICATIONS

This application is based upon and claims the benefit of priority from the prior Japanese Patent Application No. 2008-207335, filed on Aug. 11, 2008; the entire contents of which are incorporated herein by reference.

BACKGROUND OF THE INVENTION

1. Field of the Invention

The present invention relates to a solid-state image-capturing apparatus that converts an analog signal representing an image of a subject that is formed on a surface of an image-capturing device into a digital signal and performs image processing on the digital signal, thereby obtaining a desirable image similar to a scene perceived by human eyes, a camera including the solid-state image-capturing apparatus, and a signal processing method.

2. Description of the Related Art

In the field of image-capturing apparatuses, such as a digital still camera (DSC) or a camera included in a mobile phone, that outputs a digital video signal, with demands for smaller DSCs and smaller mobile phones, a thinner and smaller optical element (e.g., lens) and an optical system including fewer elements have been required in recent years. However, it is difficult to image a subject on a surface of an image-capturing device with high accuracy by using such lenses satisfying those demands, which causes many problems.

One of the problems is that light level is low at a periphery of the image-capturing device compared with near the center region thereof, which makes it difficult to control contrast at the periphery rather than at the center. To solve the problem, for example, shading correction is performed on a video signal that is converted into a digital signal, i.e., a digital video signal. Specifically, electrical shading correction is performed using correction coefficient according to a position of the surface of the image-capturing device (see, for example, Japanese Patent Application Laid-open No. 2001-339736).

There is also the solid-state image-capturing apparatus that is capable of changing an image-capturing condition, for example, an analog gain, that is used for the image-capturing device. With this solid-state image-capturing apparatus, because an image signal that is output from the image-capturing device varies according to the image-capturing condition, an optimum operation condition for various kinds of image processing to be processed downstream of the image-capturing device varies according to the image-capturing condition. However, with the technique described in the Japanese Patent Application Laid-open No. 2001-339736, the correction coefficient is determined only in terms of the position on the surface of the image-capturing device. Accordingly, an optimum processing in response to the image-capturing condition is not implemented.

BRIEF SUMMARY OF THE INVENTION

A solid-state image-capturing apparatus according to an embodiment of the present invention comprises: an image processing unit that performs edge enhancement on a digital video signal that is generated based on an analog video signal, which is obtained from a light captured by an image-capturing device and amplified by a predetermined analog gain, the edge enhancement being performed based on position information on each pixel of the image-capturing device and the analog gain.

A method of signal processing according to an embodiment of the present invention comprises: capturing a light with an image-capturing device to obtain an analog video signal; amplifying obtained analog video signal by a predetermined analog gain; generating a digital video signal based on amplified analog video signal; extracting edge information from generated digital video signal; calculating a correction coefficient that corrects the edge information based on position information on each pixel of the image-capturing device and the analog gain; multiplying extracted edge information by calculated correction coefficient; and adding a digital video signal, from which the edge information is extracted, to multiplied edge information.

BRIEF DESCRIPTION OF THE DRAWINGS

FIG. 3 is a block diagram illustrating an example configuration of an edge processing unit;

FIG. 4A is a flowchart of an example procedure for operating edge enhancement in an edge processing unit;

FIG. 4B is a flowchart of an example procedure for calculating a correction coefficient used in an edge enhancement;

DETAILED DESCRIPTION OF THE INVENTION

Exemplary embodiments of a solid-state image-capturing apparatus, a camera, and a method of processing a signal according to the present invention will be explained below in detail with reference to the accompanying drawings. The present invention is not limited to the following embodiments.

First Embodiment

Figure 1:
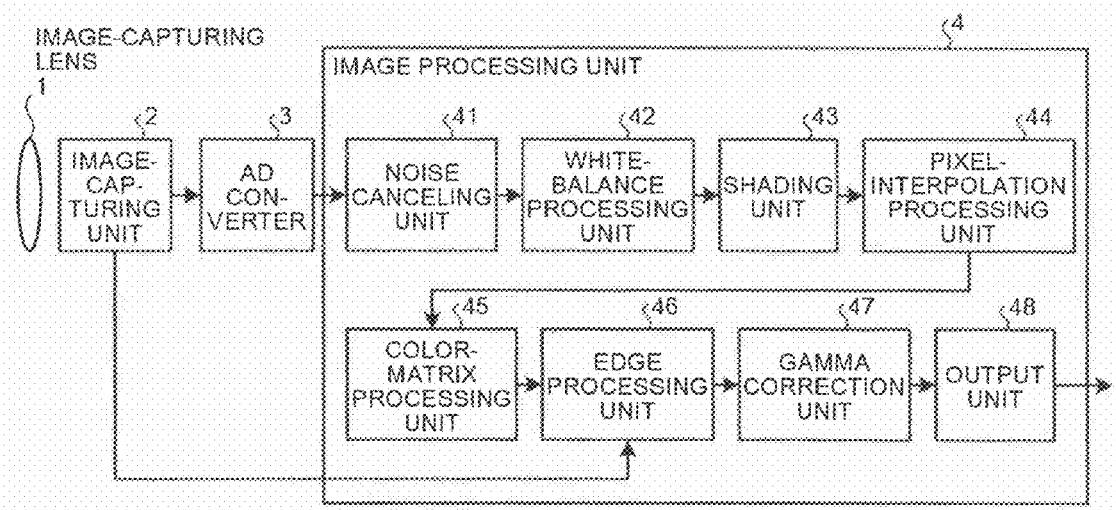
FIG. 1 is a block diagram illustrating an example configuration of a solid-state image-capturing apparatus according to a first embodiment.

FIG. 1 is a block diagram illustrating an example configuration of the solid-state image-capturing apparatus according to a first embodiment of the present invention. The solid-state image-capturing apparatus includes an image-capturing lens 1, an image-capturing unit 2, an analog-to-digital converter (AD converter) 3, and an image processing unit 4.

The image-capturing lens 1 receives light reflected from a subject. The image-capturing unit 2 captures the light incident on the image-capturing lens 1. The image-capturing unit 2 amplifies an analog video signal received from an image-capturing device, for example, an image sensor, (not shown) with a gain, for example, an analog gain, according to image-capturing condition specified from outside. The AD converter 3 converts the analog video signal, output from the image-capturing unit 2, into a digital video signal. The image processing unit 4 converts the digital video signal, output from the AD converter 3, into a clear and natural image for human perception, in other words, performs image processing on the digital video signal to convert into a desirable image similar to a scene perceived by human eyes.

The image processing unit 4 includes a noise canceling unit 41, a white-balance processing unit 42, a shading unit 43, a pixel-interpolation processing unit 44, a color-matrix processing unit 45, an edge processing unit 46, and a gamma correction unit 47, which perform image processing on the digital video signal that produces a clear and natural image for human perception. The image processing unit 4 further includes an output unit 48 that outputs the digital video signal obtained from the image processing.

The noise canceling unit 41 receives the digital video signal output from the AD converter 3 that is placed before the noise canceling unit 41, and removes a signal, i.e., noise, that is different from the signal contained in the subject image from the received digital video signal.

The white-balance processing unit 42 performs white balance processing on the digital video signal from which the noise is removed in the noise canceling unit 41.

Figure 2:
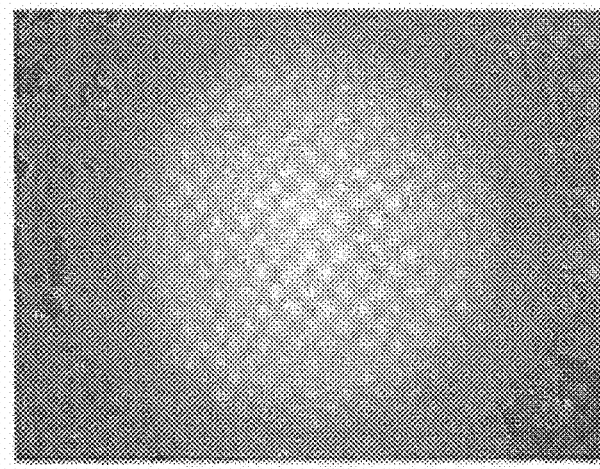
FIG. 2 is a schematic diagram of an example image of shading produced on an image.

The shading unit 43 performs electrical shading correction by multiplying the digital video signal subjected to the white balance processing in the white-balance processing unit 42 by a correction coefficient (hereinafter, "shading-correction coefficient") that is individually determined according to a corresponding pixel position, that is, according to a signal that is received from which pixel in the image-capturing device. Position information indicating the pixel position is calculated based on a vertical-synchronizing signal (V synchronizing signal), and a horizontal-synchronizing signal (H synchronizing signal). These synchronizing signals are used when the image-capturing device is driven in the image-capturing unit 2, i.e., the synchronizing signals specify the pixel that reads out charge stored in the image-capturing device. As shown in FIG. 2, when shading occurs, a light level at a peripheral region is insufficient compared with the center region of the image. Accordingly, the shading-correction coefficient is determined in such a manner a value of the shading-correction coefficient increases as the position of the pixel comes closer to the peripheral region (i.e., goes away from the center). For example, the shading-correction coefficient is calculated using Equation (1) below:

$$\text{(shading-correction coefficient)} = ax^2 + by^2 \quad (1)$$

where a and b are constants determined in advance, and x and y are elements of two-dimensional vector indicating each of the pixel positions when the center pixel is used as reference. For simplification of the description, the element x is referred to as "horizontal-position information x" and the element y is referred to as "vertical-position information y".

The pixel-interpolation processing unit 44 performs pixel interpolation on the digital video signal subjected to the shading correction in the shading unit 43.

The color-matrix processing unit 45 performs color matrix calculation, i.e., color reproduction, on the digital video signal subjected pixel interpolation in the pixel-interpolation processing unit 44.

The edge processing unit 46 performs edge enhancement using the correction coefficient, which is calculated based on the image-capturing condition and each pixel position in the image-capturing unit 2, on the digital video signal subjected to the color reproduction in the color-matrix processing unit 45. Detailed description of a calculation operation of the correction coefficient and the edge enhancement using the calculated correction coefficient is described later.

The gamma correction unit 47 performs gamma correction on the digital video signal subjected to the edge enhancement in the edge processing unit 46.

The output unit 48 outputs the digital video signal subjected to the gamma correction in the gamma correction unit 47 as the final digital video signal, i.e., a corrected digital video signal, to an external unit.

The operation of the edge enhancement performed by the edge processing unit 46 by calculating the correction coefficient will be described in detail with reference to FIGS. 3, 4A, and 4B. FIG. 3 is a block diagram illustrating the configuration of the edge processing unit 46. FIG. 4A is a flowchart of an example procedure for edge enhancement in the edge processing unit 46. FIG. 4B is a flowchart of example procedure for calculating a correction coefficient used in edge enhancement.

As shown in FIG. 3, the edge processing unit 46 includes a position-information calculating unit 461 formed of a horizontal-position-information calculating unit 461x and a vertical-position-information calculating unit 461y, a gain-coefficient calculating unit 462, a correction-coefficient calculating unit 463, an edge-information extracting unit 464, a multiplier 465, and an adder 466. The edge-information extracting unit 464, the multiplier 465, and the adder 466 form an edge-enhancing unit.

The edge processing unit 46, having such a configuration described above, performs the edge enhancement, according to a process shown in FIG. 4A, on the digital video signal received from the color-matrix processing unit 45 that is placed before the edge processing unit 46.

First, in the edge processing unit 46, the edge-information extracting unit 464 extracts edge information from an input digital video signal (Step S1 in FIG. 4A). Then, the correction coefficient for correcting the extracted edge information is calculated according to a procedure shown in FIG. 4B (Step S2). Specifically, the correction-coefficient calculating unit 463 sets constants A and B for calculating the correction coefficient (Step S21). In the position-information calculating unit 461, the horizontal-position-information calculating unit 461x calculates the horizontal-position information x based on the H synchronizing signal, and the vertical-position-information calculating unit 461y calculates vertical-position information y based on the V synchronizing signal; therefore position information indicating a pixel position is obtained (Step S22). Both the synchronizing signals, i.e., the H synchronizing signal and the V synchronizing signal, which are used for calculating the position information, is the same as those used when the shading unit 43 calculates the position information. The position-information calculating unit 461 calculates the position information with the same procedure as processed by the shading unit 43. The gain-coefficient calculating unit 462 calculates a gain coefficient C that is used in correction coefficient calculation processing performed in the correction-coefficient calculating unit 463 (Step S23). The gain coefficient C is calculated based on an image-capturing condition obtained from the image-capturing unit 2 or an image-capturing condition in the image-capturing unit 2 obtained from outside and stored in advance in the gain-coefficient calculating unit 462.

Figure 5A:
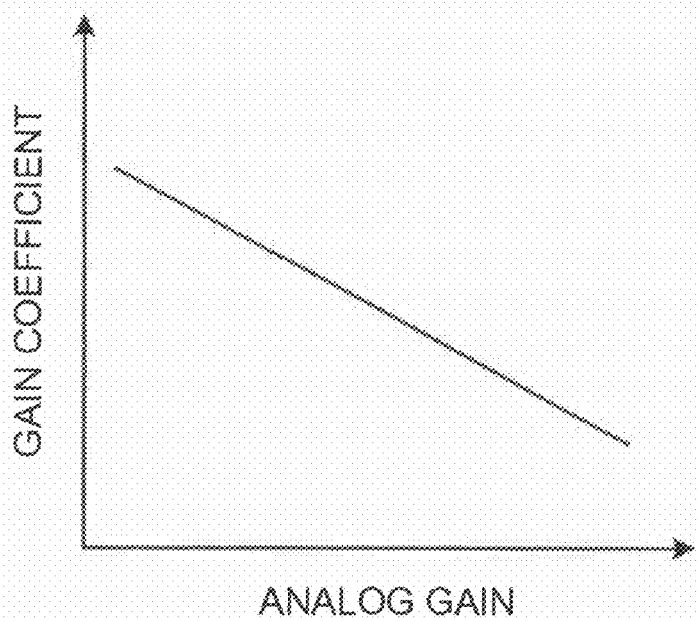
FIG. 5A is a graph for explaining the relation between an analog gain and a gain coefficient.

When the gain-coefficient calculating unit 462 calculates the gain coefficient C, for example, the analog gain, which is one of conditions included in the image-capturing condition, is used. As shown in FIG. 5A, when using the analog gain, the gain coefficient C is calculated so that the gain coefficient C becomes large when the analog gain is low, whereas, the gain coefficient C becomes low when the analog gain is high. The analog gain is used to amplify a signal received via the image-capturing device in the image-capturing unit 2. Equation (2) shown below is an example for calculating the gain coefficient C:

$$C = (\alpha - \beta) \times AG + \beta \qquad (2)$$

where α and β are the predetermined constants, and AG is the analog gain.

The correction-coefficient calculating unit 463 calculates the correction coefficient based on the position information (x, y) calculated by the position-information calculating unit 461, the gain coefficient C calculated by the gain-coefficient calculating unit 462, and the constants (A, B) that are set at the above Step S21 (Step S24). The correction coefficient can be calculated using Equation (3) below:

$$(\text{correction coefficient}) = (Ax^2 + By^2) \times C \qquad (3)$$

Figure 5B:
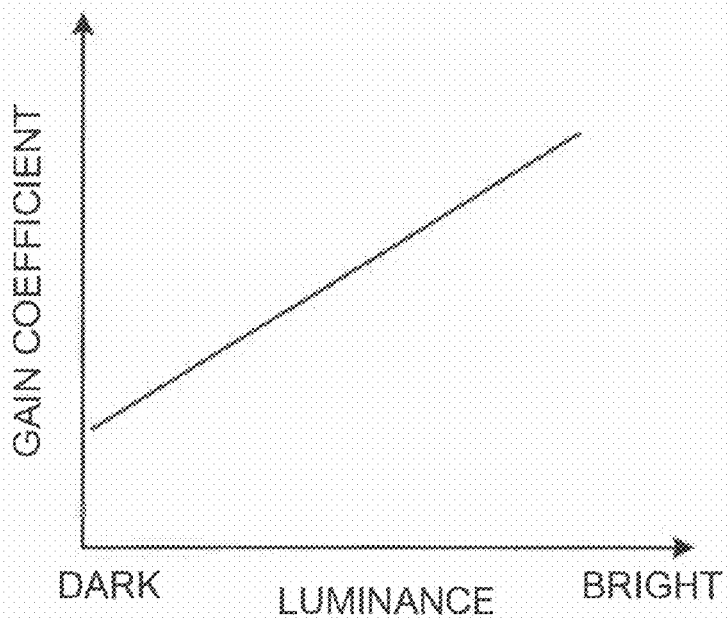
FIG. 5B is a graph for explaining the relation between luminance information and the gain coefficient.

The gain-coefficient calculating unit 462 calculates the gain coefficient C based on the analog gain; however, it is also possible for the gain-coefficient calculating unit 462 to calculate the gain coefficient C based on luminance information that varies according to the analog gain. The luminance information can be calculated from the digital video signal. When calculating the gain coefficient C based on the luminance information, as shown in FIG. 5B, the gain-coefficient calculating unit 462 calculates the gain coefficient C so that the higher (brighter) the luminance is, the higher the gain coefficient C is. This is because, when the luminance is high, a desired signal-to-noise ratio (S/N ratio) is obtained; therefore, the noise is not easily amplified even when setting the gain high. Equation to be used in the calculation in this case is the same as the above-described Equation (2). Specifically, when the luminance information is used instead of the analog gain, the gain coefficient C is calculated by using an equation almost the same as Equation (2) except that α and β in Equation (2) are replaced with constants for the luminance information and analog gain (AG) in Equation (2) is replaced with the luminance information.

Referring back to FIG. 4A, the procedure shown in FIG. 4A is described. After processing at Step S2 is performed, and after the correction-coefficient calculating unit 463 calculates the correction coefficient, the multiplier 465 corrects the edge information by multiplying the correction coefficient by the edge information extracted by the edge-information extracting unit 464 at Step S1 (Step S3). The adder 466 adds the corrected edge information output from the multiplier 465 to the digital video signal from which the edge information is extracted in edge-information extracting unit 464. Accordingly, an edge-enhanced digital video signal is generated (Step S4).

As described above, the position information calculated by the position-information calculating unit 461 in the edge processing unit 46 is the same position information, i.e., the horizontal-position information x and the vertical-position information y, that is calculated when the shading unit 43 performs the electrical shading correction. Accordingly, the edge processing unit 46 can use the position information calculated by the shading unit 43, i.e., can obtain the position information from the shading unit 43, instead of calculating the position information by the edge processing unit 46 itself.

In this way, with the solid-state image-capturing apparatus according to the first embodiment, the image processing, i.e., the edge correction, for correcting the edge information of the digital video signal is performed, on the video signal that has been converted to the digital signal, based on the position information indicating that the video signal to be processed is received from which pixel in the image-capturing device, and the image-capturing condition (the above-described analog gain) or the luminance information that varies according to the image-capturing condition. The image processing according to the image-capturing condition is thus possible. In particular, when compared with a case in which the edge correction is performed only considering the position information, more precise edge correction can be implemented. For example, when the analog gain is high or the luminance is low, the edge correction can be controlled by weakening the edge correction to prevent noise from being enhanced due to inferior S/N condition. In contrast, when the analog gain is low or the luminance is high, the edge correction can be controlled by enhancing the edge correction due to superior S/N condition.

Because the edge correction is performed based on the position information and the image-capturing condition, it is not necessary to perform the shading correction before the edge correction even when counter measures against shading in an optical system are insufficient. This allows the configuration in which the shading correction can be performed after the edge correction has been implemented; therefore more flexible system design is possible than before.

The position information calculated in shading correction processing can be used for edge correction. Accordingly, it is possible to reduce the system size by employing the configuration in which the position information that has been calculated in the shading correction processing is used. Because the position information is calculated based on the synchronizing signal that is necessary for driving the image-capturing device, the position information can be easily obtained regardless the system design.

Second Embodiment

Figure 6:
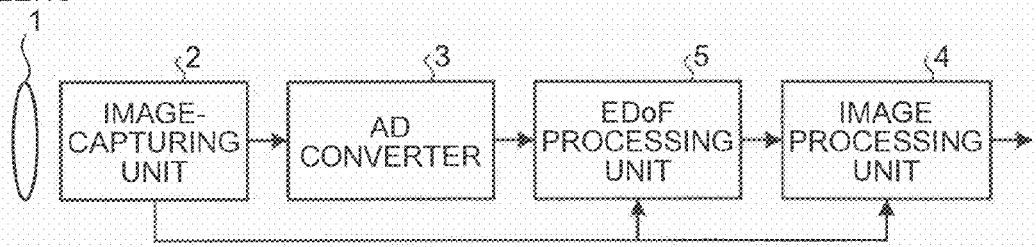
FIG. 6 is a block diagram illustrating an example configuration of a solid-state image-capturing apparatus according to a second embodiment of the present invention.

A second embodiment of the present invention is described. FIG. 6 is a block diagram illustrating an example configuration of a solid-state image-capturing apparatus according to the second embodiment. As shown in FIG. 6, the solid-state image-capturing apparatus according to the second embodiment additionally includes an extended depth of focus (EDoF) processing unit 5 that is placed between the AD converter 3 and the image processing unit 4 of the solid-state image-capturing apparatus according to the first embodiment shown in FIG. 1. The components other than the EDoF processing unit 5 are the same as those in the first embodiment 1; therefore, only the EDoF processing unit 5 is described in the second embodiment.

The EDoF processing unit 5 performs a digital image processing that uses an EDoF technique on the digital video signal output from the AD converter 3. The EDoF technique is a technique to make an in-focus image by performing predetermined edge processing based on contrast information of a digital video signal output from an image sensor. With the conventional EDoF technique, processing is performed on assumption that a video signal does not have shading, i.e., a video signal obtained from an optical system in which sufficient counter measures against shading are taken.

However, as described above, in recent years, it is sometimes hard to take sufficient counter measures against shading due to limited configuration of the optical system. Accordingly, when employing the configuration shown in FIG. 6, with insufficient counter measures against shading in the optical system, it is possible to create an in-focus state near the center of the image due to EDoF processing, however, an appropriate processing is not performed at the periphery caused by shading, resulting in inaccurate processing. The EDoF processing unit 5, constituting the solid-state image-capturing apparatus according to the second embodiment, calculates the position information on the pixel from the vertical-synchronizing signal and the horizontal-synchronizing signal contained in a control signal, i.e., image-capture driving signal, that is used for driving the image-capturing device in the image-capturing unit 2 and changes a processing level of the EDoF processing based on the calculated position information. When changing the processing level, in a similar manner as in the edge processing unit 46 described in the first embodiment, the image-capturing condition in the image-capturing unit 2 or information corresponding to the image-capturing condition, i.e., analog gain or luminance information, is also considered. Accordingly, the EDoF processing unit 5 changes the processing level of the EDoF processing based on the position information, and the image-capturing condition (analog gain) or the information corresponding to the image-capturing condition (luminance information).

In this way, with the solid-state image-capturing apparatus according to the third embodiment, in the image processing unit 4 described in the first embodiment, before performing the above-described image processing, the EDoF processing (digital image processing using EDoF technique) is performed by changing the processing level based on the position information and the image-capturing condition (or information that varies according to the image-capturing condition). Accordingly, it is possible to prevent accuracy of the EDoF processing from degrading due to an optical factor. Even when it is difficult to take the sufficient counter measures against shading in the optical system, the EDoF processing can be performed before the electrical shading correction, i.e., the above-described lens shading correction, which allows the flexible system design.

Third Embodiment

A third embodiment of the present invention is described. In the third embodiment, noise canceling processing is described, which is performed by the noise canceling unit 41 of the image processing unit 4 included in the solid-state image-capturing apparatus according to the first embodiment and the second embodiment.

With the noise canceling processing, in addition to noise that is unwanted information, part of significant information, for example, the edge information, is also removed from the digital video signal. Accordingly, the solid-state image-capturing apparatus according to the third embodiment temporarily stores the possible significant information that is eliminated (removed) in the noise canceling processing, and adds the stored information to the digital video signal from which the noise is removed. This prevents the significant information from being eliminated in the noise canceling processing.

Figure 7:
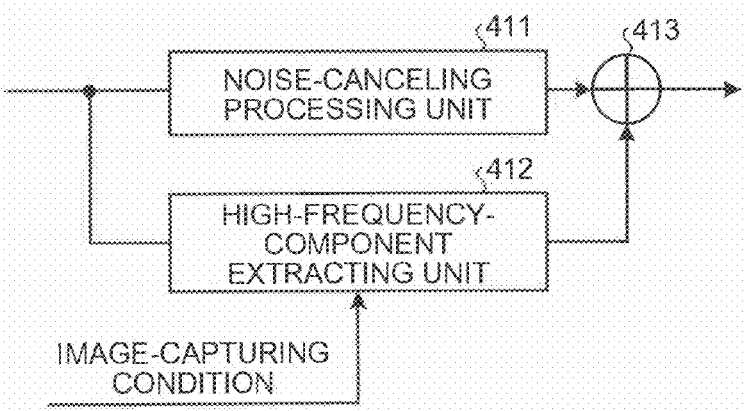
FIG. 7 is a block diagram illustrating an example configuration of a noise canceling unit of a solid-state image-capturing apparatus according to a third embodiment of the present invention.

FIG. 7 is a block diagram illustrating an example configuration of the noise canceling unit 41 of the solid-state image-capturing apparatus according to the third embodiment. As shown in FIG. 7, the noise canceling unit 41 includes a noise-canceling processing unit 411 that removes the noise from the input digital video signal; a high-frequency-component extracting unit 412 that extracts a high-frequency component from the input digital video signal; and an adder 413 that adds the high-frequency component extracted in the high-frequency-component extracting unit 412 to the digital video signal from which noise is removed in the noise-canceling processing unit 411.

The operation of the high-frequency-component extracting unit 412 is described in detail. The high-frequency-component extracting unit 412 calculates the position information on the pixel from the vertical-synchronizing signal and the horizontal-synchronizing signal contained in the control signal, i.e., an image-capture driving signal, that is used for driving the image-capturing device in the image-capturing unit 2. Thereafter, the high-frequency-component extracting unit 412 determines an extracting condition of the high-frequency component based on the calculated position information, and the image-capturing condition in the image-capturing unit 2 or the information that varies according to the image-capturing condition. The extracting condition is, for example, a filter coefficient that is used when extracting the high-frequency component. With the noise canceling unit 41 of the solid-state image-capturing apparatus according to the second embodiment (see FIG. 6), because the EDoF processing unit 5, which is placed before the noise canceling unit 41, can also calculate the position information, it is possible to use the position information calculated by the EDoF processing unit 5, instead of making the high-frequency-component extracting unit 412 calculate the position information.

An alternative configuration is possible such that, before the noise-canceling processing unit 411 removes the noise, the high-frequency-component extracting unit 412 extracts (removes) the high-frequency component, and the extracted high-frequency component is added to the digital video signal from which noise is removed. Specifically, the following processing can be implemented. The high-frequency-component extracting unit 412 outputs, to the noise-canceling processing unit 411, the digital video signal from which the high-frequency component is removed. The noise-canceling processing unit 411 removes the noise from the digital video signal from which the high-frequency component is removed. The adder 413 adds the high-frequency component that is extracted in the high-frequency-component extracting unit 412 to the digital video signal from which the noise is removed in the noise-canceling processing unit 411.

Alternatively, when adding the high-frequency component received from the high-frequency-component extracting unit 412, the adder 413 applies weighting to the high-frequency component according to the position information, i.e., multiplies a weighting factor calculated based on the position information by the high-frequency component, and adds the obtained value to the digital video signal from which the noise, output from the high-frequency-component extracting unit 412, is removed. The weighting process also can be performed by the high-frequency-component extracting unit 412.

The noise canceling unit 41 does not necessarily have to be arranged as shown in FIG. 1. For example, the noise canceling unit 41 can be arranged after the gamma correction unit 48. When arranging components that calculate the position information, such as the shading unit 43 and the edge processing unit 46, before the noise canceling unit 41, it is possible to use the position information calculated by those components, instead of making the high-frequency-component extracting unit 412 calculate the position information.

With the solid-state image-capturing apparatus according to the third embodiment, when performing the noise canceling processing on the video signal, a predetermined high-frequency component is extracted from the video signal, the extracted high-frequency component is stored according to the condition determined based on the position information and the image-capturing condition (or the information that varies according to the image-capturing condition), and the stored high-frequency component is added to the video signal from which the noise is removed. Accordingly, it is possible to prevent degradation of images due to the optical factor, thus implementing the noise canceling processing with high accuracy. In other words, it is possible to prevent the high-frequency component contained in the video signal from being removed by the noise canceling processing more than necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image-capturing apparatus that converts light, which is reflected from a subject and is incident via an image-capturing lens, into an electrical signal, the solid-state image-capturing apparatus comprising an image processing unit that performs edge enhancement on a digital video signal that is generated based on an analog video signal, which is obtained from the light captured by an image-capturing device and amplified by a predetermined analog gain, the edge enhancement being performed based on position information on each pixel of the image-capturing device and the analog gain wherein, when using, as the position information, coordinates indicated by a two-dimensional vector with reference to a pixel at a center of the image-capturing device, a correction-coefficient calculating unit calculates a first value obtained by multiplying a predetermined coefficient by square of a value of horizontal position information x contained in the position information and a second value obtained by multiplying a predetermined coefficient by square of a value of vertical position information y contained in the position information, further multiplies a gain coefficient by a sum of the first value and the second value, and sets an obtained value as a correction coefficient.

2. The solid-state image-capturing apparatus according to claim 1, wherein the image processing unit includes
the correction-coefficient calculating unit that calculates a correction coefficient used in the edge enhancement based on the position information and the analog gain; and
an edge-enhancing unit that performs the edge enhancement by multiplying edge information contained in the digital video signal by the correction coefficient.

3. The solid-state image-capturing apparatus according to claim 1, wherein the image processing unit includes
the correction-coefficient calculating unit that calculates a correction coefficient used in the edge enhancement based on luminance information that varies according to the position information and the analog gain; and
an edge-enhancing unit that performs the edge enhancement by multiplying edge information contained in the digital video signal by the correction coefficient.

4. The solid-state image-capturing apparatus according to claim 2, wherein the edge-enhancing unit includes
an edge-information extracting unit that extracts the edge information from the digital video signal;
a multiplying unit that multiplies the edge information by the correction coefficient; and
an adding unit that adds edge information, which is multiplied by the correction coefficient, to the digital video signal from which the edge information is extracted.

5. The solid-state image-capturing apparatus according to claim 2, further comprising a position-information calculating unit that calculates the position information based on a horizontal-synchronizing signal and a vertical-synchronizing signal, wherein the correction-coefficient calculating unit calculates the correction coefficient by using the position information calculated by the position-information calculating unit.

6. The solid-state image-capturing apparatus according to claim 2, further comprising a gain-coefficient calculating unit that calculates, based on the analog gain, the gain coefficient indicating a high value when the analog gain is low and indicating a low value when the analog gain is high, wherein the correction-coefficient calculating unit calculates the correction coefficient by using the gain coefficient calculated by the gain-coefficient calculating unit.

7. The solid-state image-capturing apparatus according to claim 2, further comprising:
a position-information calculating unit that calculates the position information based on a horizontal-synchronizing signal and a vertical-synchronizing signal; and
a gain-coefficient calculating unit that calculates, based on the analog gain, the gain coefficient indicating a high value when the analog gain is low and indicating a low value when the analog gain is high, wherein
the correction-coefficient calculating unit calculates the correction coefficient by using the position information calculated by the position-information calculating unit and the gain coefficient calculated by the gain-coefficient calculating unit.

8. The solid-state image-capturing apparatus according to claim 5, wherein the position-information calculating unit calculates, as the position information, coordinates that are indicated by a two-dimensional vector, with reference to a pixel at a center of the image-capturing device.

9. The solid-state image-capturing apparatus according to claim 1, wherein the image processing unit
receives an initial digital video signal obtained by performing analog-to-digital conversion of an amplified analog video signal,
performs, on the initial digital video signal, noise canceling processing, white balance processing, shading correction processing, pixel interpolation and color reproduction, thereby generating the digital video signal, and
performs the edge enhancement on the digital video signal.

10. The solid-state image-capturing apparatus according to claim 1, wherein the image processing unit further performs gamma correction on a signal obtained by the edge enhancement and outputs gamma corrected signal.

11. The solid-state image-capturing apparatus according to claim 1, further comprising an extended depth of focus processing unit that performs digital image processing using an extended depth of focus technique, the extended depth of focus technique being based on the position information and the analog gain, on the digital video signal that is obtained by analog-to-digital conversion of an amplified analog video signal, wherein the image processing unit performs the edge enhancement on the digital video signal subjected to the digital image processing that is processed by the extended depth of focus processing unit.

12. The solid-state image-capturing apparatus according to claim 1, wherein the image processing unit includes a noise canceling unit that removes noise from the digital video signal, extracts a high-frequency component from the digital video signal based on the position information and the analog gain, and adds extracted high-frequency component to the digital video signal from which the noise is removed.

13. The solid-state image-capturing apparatus according to claim 1, wherein the image processing unit includes a noise canceling unit that removes noise from the digital video signal, extracts a high-frequency component from the digital video signal based on the position information and the analog gain, applies weighting to extracted high-frequency component according to the position information, thereby generating a signal, and adds the signal to the digital video from which the noise is removed.

14. The solid-state image-capturing apparatus according to claim 1, further comprising:
   an image-capturing unit that includes the image-capturing device and amplifies the analog video signal, which is captured by the image-capturing device, by the predetermined analog gain; and
   an analog to digital converter that converts the analog video signal that is amplified by the image-capturing unit to the digital video signal.

15. A camera comprising:
   the solid-state image-capturing apparatus according to claim 14; and
   an image-capturing lens.

16. A method of signal processing performed by a solid-state image-capturing apparatus that converts light, which is reflected from a subject and incident via an image-capturing lens, into an electrical signal, the method comprising:
   capturing the light with an image-capturing device to obtain an analog video signal;
   amplifying obtained analog video signal by a predetermined analog gain;
   generating a digital video signal based on amplified analog video signal;
   extracting edge information from generated digital video signal;
   calculating a correction coefficient that corrects the edge information based on position information on each pixel of the image-capturing device and the analog gain;
   multiplying extracted edge information by calculated correction coefficient; and
   adding a digital video signal, from which the edge information is extracted, to multiplied edge information
   wherein, when using, as the position information, coordinates indicated by a two-dimensional vector, with reference to a pixel at a center of the image-capturing device, the calculating includes calculating a first value obtained by multiplying a predetermined coefficient by a value of square of horizontal position information x contained in the position information and a second value obtained by multiplying a predetermined coefficient by a value of square of vertical position information y contained in the position information, further multiplying a sum of the first value and the second value by the gain coefficient that is calculated based on the analog gain, and setting a result of multiplication of the sum of the first value and the second value by the analog gain as a correction coefficient.

17. The method according to claim 16, wherein the extracting includes performing digital image processing, on a first digital video signal, which is obtained by analog-to-digital conversion of the amplified analog video signal, using an extended depth of focus technique, the extended depth of focus technique being based on the position information on the each pixel of the image-capturing device and the analog gain, thereby obtaining a second digital video signal, and the extracting includes extracting the edge information from the second digital video signal.

18. The method according to claim 16, wherein the extracting includes generating a first digital video signal based on the amplified analog video signal, further generating a second digital video signal by removing noise from the first digital video signal, extracting a high-frequency component from the first digital video signal based on the position information on the each pixel of the image-capturing device and the predetermined analog gain, adding extracted high-frequency component to the second digital video signal, thereby obtaining a third digital video signal, and extracting the edge information from the third digital video signal.

* * * * *